United States Patent [19]

Harding et al.

[11] Patent Number: 4,988,374
[45] Date of Patent: Jan. 29, 1991

[54] METHOD AND APPARATUS FOR CONTAMINANT REMOVAL IN MANUFACTURING OPTICAL FIBRE

[75] Inventors: Ian D. Harding, Saffron Walden; Peter R. Ince, Brentwood; Roger S. Preston, Upminster, all of Great Britain

[73] Assignee: STC PLC, London, England

[21] Appl. No.: 270,234

[22] Filed: Nov. 14, 1988

[30] Foreign Application Priority Data

Nov. 12, 1987 [GB] United Kingdom ............... 8726508

[51] Int. Cl.⁵ ............................................. C03B 37/02
[52] U.S. Cl. ............................................. 65/2; 65/12; 65/13; 65/27; 65/168; 65/171
[58] Field of Search .................. 65/2, 12, 13, 32.1, 65/27, 11.1, 168, 171–173

[56] References Cited

U.S. PATENT DOCUMENTS

| | | | |
|---|---|---|---|
| 4,030,901 | 6/1977 | Kaiser | 65/2 |
| 4,309,201 | 1/1982 | Klop et al. | 65/2 |
| 4,673,427 | 6/1987 | Van Der Giessen et al. | 65/2 |

Primary Examiner—Joye L. Woodard
Attorney, Agent, or Firm—Lee, Mann, Smith McWilliams & Sweeney

[57] ABSTRACT

An extrnal fibre drawing furnace is maintained at or close to its normal working temperature while contaminants are removed between fibre pulls. Either a removable insert, replaceable gas port assembly, or cleanable gas transfer duct, enable this to be achieved while the furnace is maintained at or near its operating temperature, so that the down time is of the order of minutes rather than hours.

8 Claims, 4 Drawing Sheets

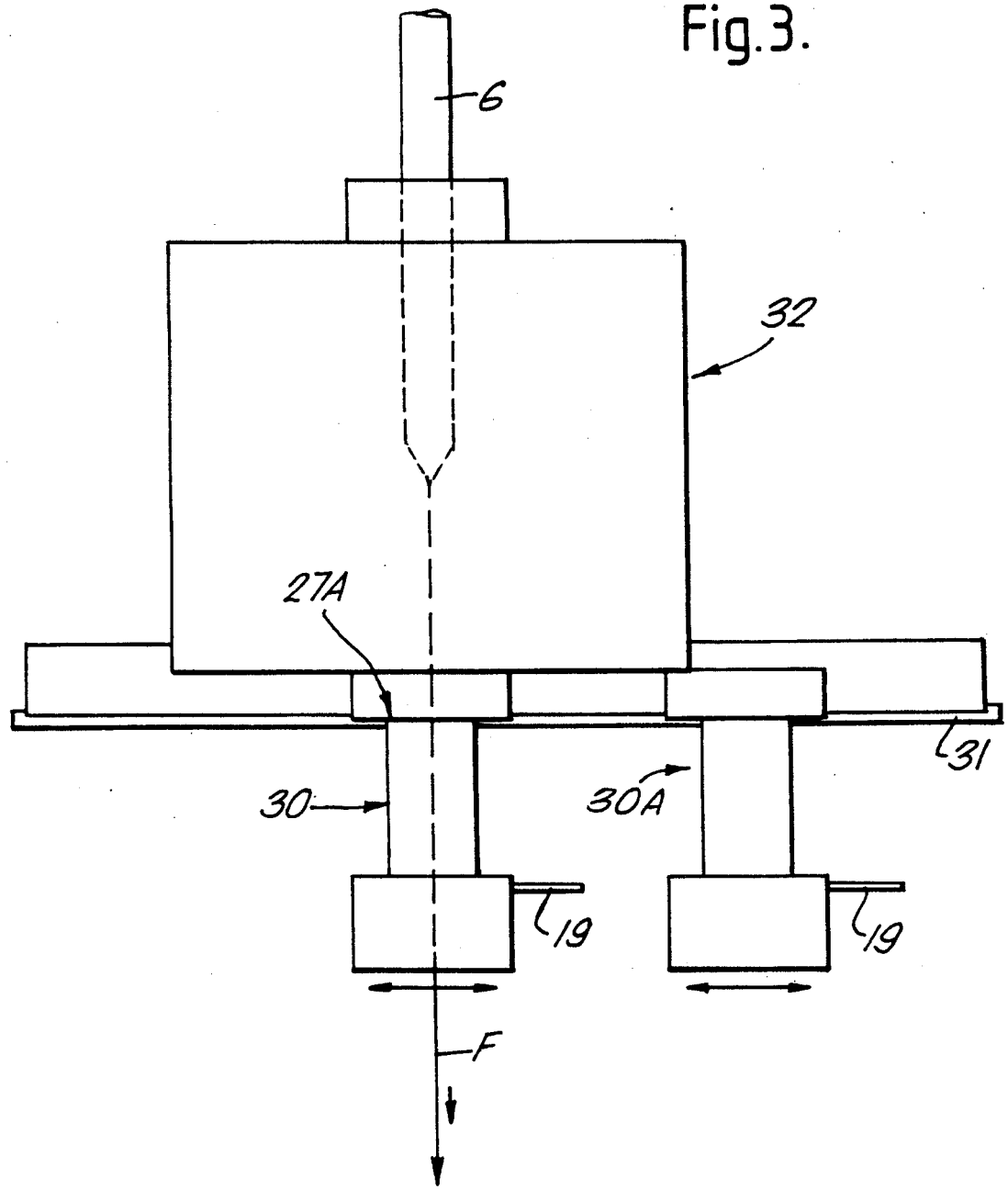

METHOD AND APPARATUS FOR CONTAMINANT REMOVAL IN MANUFACTURING OPTICAL FIBRE

This invention relates to manufacturing optical fibre.

BACKGROUND OF THE INVENTION

When drawing optical fibre, either monomode or multimode, from a silicon glass preform, a cylindrical furnace melts the tip of the preform which is lowered at a controlled rate into the furnace while optical fibre is drawn from the molten tip. The preform passes into the furnace at the top entrance to the furnace and the fibre is drawn through the bottom exit. An inert gas, for example Argon, Nitrogen, Helium etcetera is introduced into the furnace either around the preform entrance or the fibre exit mainly to protect the vulnerable parts of the furnace, which are normally made of graphite. A gas exit port is provided at the opposite end of the furnace to take away the gas. Thus the furnace remains purged with gas during normal operation. The temperature of the furnace is around 2200° C., but could be in the range 1800° C. to 2500° C.

The furnace is surrounded by and insulated from a water-cooled jacket, which also cools the entrance to and exit from the furnace, together with the gas entrance and exit ports.

As the preform melts, a small amount of silica is burnt off as a vapour and carried with the gas and we have found that this burnt off silica tends to condense out on cooler parts of the furnace particularly on the approaches to and near the gas exit port for the purging gas. Eventually this deposit has to be cleaned off otherwise it affects initially the fibre diameter control arrangement and eventually the fibre strength through flaking of the deposit taking place on the fibre being drawn.

In an induction furnace there may be no gas purging through the furnace, but the contamination referred to above also occurs in an induction furnace and, like the graphite furnace, is dependent upon rate of feed of the preform, the furnace temperature, and the surface area of. Natural convection currents will carry the contaminants to the upper entrance.

If fibre is pulled substantially continuously, then apart from replacing the preform, after about twenty hours the contamination referred to has reached a stage at which the fibre specification and strength become suspect, and so the contamination must be cleared out. This requires the furnace to be ramped down and as much as four or five hours production time is lost.

It is an object of the present invention to overcome the difficulties referred to above to enable far better utilisation of the fibre drawing equipment.

SUMMARY OF THE INVENTION

According to the present invention there is provided a method of operating an optical fibre drawing furnace having a preform entrance and fibre exit, comprising providing the entrance or exit with a duct, running the furnace at a temperature in the range suitable for drawing optical fibre from a preform, melting a preform in the furnace progressively and drawing a fibre from the preform, causing contaminants produced by the drawing process to traverse said duct, so that said contaminants become deposited on said duct, ceasing drawing said fibre, and, while maintaining the furnace at or near said temperature and where necessary closing the entrance and/or exit, removing the deposited contaminant from the furnace, and finally drawing further fibre from a fibre preform in the furnace after opening the entrance and/or exit if they have been closed.

In one embodiment the furnace is a graphite furnace which is purged with inert gas during the drawing process and during the cleaning, and the duct is formed by a removable insert which is removed and replaced by a similar insert to effect the removal of the contaminant.

In an alternative embodiment the entrance or exit port is formed by an assembly of parts containing said duct, and the assembly is replaced by a standby assembly to effect said contaminant removal.

In both embodiments described, the insert or the assembly can be taken away from the fibre drawing site, completely cleaned and used again the next time the contaminant has reached a point at which removal thereof becomes necessary.

In a third embodiment it is proposed that the duct is provided by a radial gas manifold on the exit or entrance to the furnace, which manifold is accessible for cleaning in situ on the furnace while the furnace is at its normal preform-melting temperature. In this embodiment it is not necessary to remove the manifold; simply one or more access covers are removed after the furnace exit and entrance are closed by respective mechanical irises, in order to gain access to the duct, which is then cleaned mechanically with a brush, with or without a solvent, and a gas blast or vacuum.

BRIEF DESCRIPTION OF THE DRAWINGS

In order that the invention can be clearly understood, rerference will now be made to the accompanying drawings, in which:

FIG. 3 shows the furnace of FIG. 1 modified according to a second embodiment of the invention.

DESCRIPTION OF THE PREFERRED EMBODIMENTS

Figure 1:
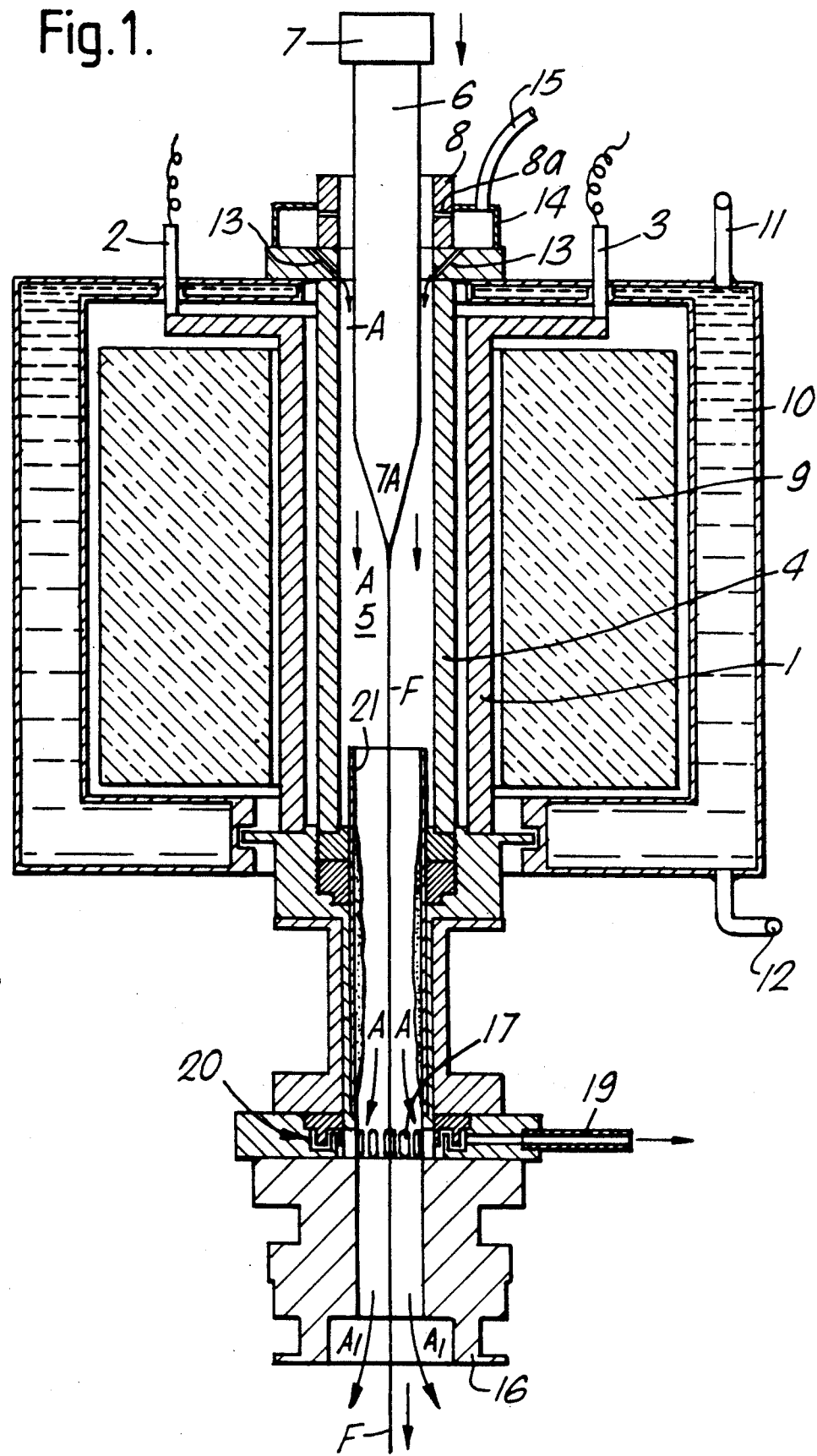
FIG. 1 is a schematic cross section of an optical fibre drawing furnace according to an embodiment of the invention.

Referring to FIG. 1 of the drawings, the furnace is depicted somewhat schematically to illustrate only those features essential to an understanding of the present invention. The furnace in this embodiment is a graphite furnace and is of the passive type. It comprises a graphite resistance heater element 1 connected to an electrical supply by terminals 2 and 3. A graphite tubular liner 4 defines the cylindrical space 5 in which a preform 6 is introduced by a holding chuck 7 which gradually advances the preform into the furnace through the furnace entrance 8.

The element 1 is surrounded by a heat-insulating jacket 9, in turn surrounded by a water-cooled jacket 10 having water inlet and outlet hoses 11 and 12.

Just inside the entrance 8 is a plurality of gas entry ports 13 which are inclined toward the axis of the preform 6 and inject inert gas (argon) into the space 5 in the direction of the arrows A. The gas is supplied to the ports 13 via a manifold 14 from a gas supply hose 15. The gas prevents oxidation of the graphite liner 4. The furnace runs at a temperature of about 2200° C. and as shown the preform tip 7a melts and forms a fibre F which is drawn through the exit 16.

The gas is drawn out through exit ports 17 in an adaptor tube 18 (shown more clearly in FIG. 2) and into a vacuum hose 19 via annular gas baffles 20. The adaptor tube 18 supports a silica glass contaminant tube 21 in an annular recess 18A and this tube extends into the furnace region but not as far as the molten tip 7A of the preform. The tube 21 fits a graphite sleeve 28 which supports the liner 4 and seals the furnace space 5 to the tube 21. The tube 21 forms a duct on whose walls will condense the silica vapour carried by the gas indicated by arrows A, as silica carbide deposit. This is indicated at 22. Because the tube 21 is at a temperature in the range 500° to 800° C. the condensation will take place on the tube wall although some will be extracted with the gas through ports 17. Most of the gas exits through the ports 17 but some will pass on through the exit 16, as indicated by arrows $A_1$.

The gas may be introduced at a rate of about 20 litres per minute.

When the deposit 22 becomes large enough to require removal, the drawing process is terminated, the irises 8A and 16A are closed to seal the entrance 8 and exit 16, and the securing bolts 23 are removed. This release clamping ring 24. This enables ring 24 together with adaptor tube 18 and contaminant tube 21 to be slid out from the mounting ring 25 until the top 21A of the tube 21 just clears the second iris 26, which is then closed so that the tube can be completely removed from the furnace and replaced immediately with another clean contaminant collecting tube 21, the iris 26 being opened to allow insertion of tube 21 plus adaptor tube 18 and finally iris 16A is opened when drawing a fresh fibre from a fresh preform. The gas supply is re-introduced before the top iris 8A is opened to allow the fresh preform to be introduced.

An alternative embodiment is illustrated in FIG. 3 in which the whole assembly 30, which represents the lower gas port, has a standby duplicate 30A.

Both assemblies can be slid sideways simultaneously so that assembly 30A replaces assembly 30 in position for drawing under the furnace which is indicated generally by the reference 32 and is similar to the furnace shown in FIG. 1. Also each assembly 30 and 30A is similar to the assembly shown in detail in FIG. 2 up to the upper interface 27A between the clamped support tube 27 and the mounting ring 25. The assemblies 30 and 30A slide at that interface. Like parts with FIGS. 1 and 2 have like reference numerals. In this case no special removable tube. 21 or adaptor tube 18 is required because the whole assembly 30 or 30A can be removed and cleaned while the other is in place and working. A dovetail track 31 is used to enable the assemblies to slide into and out of position.

Figure 4A:
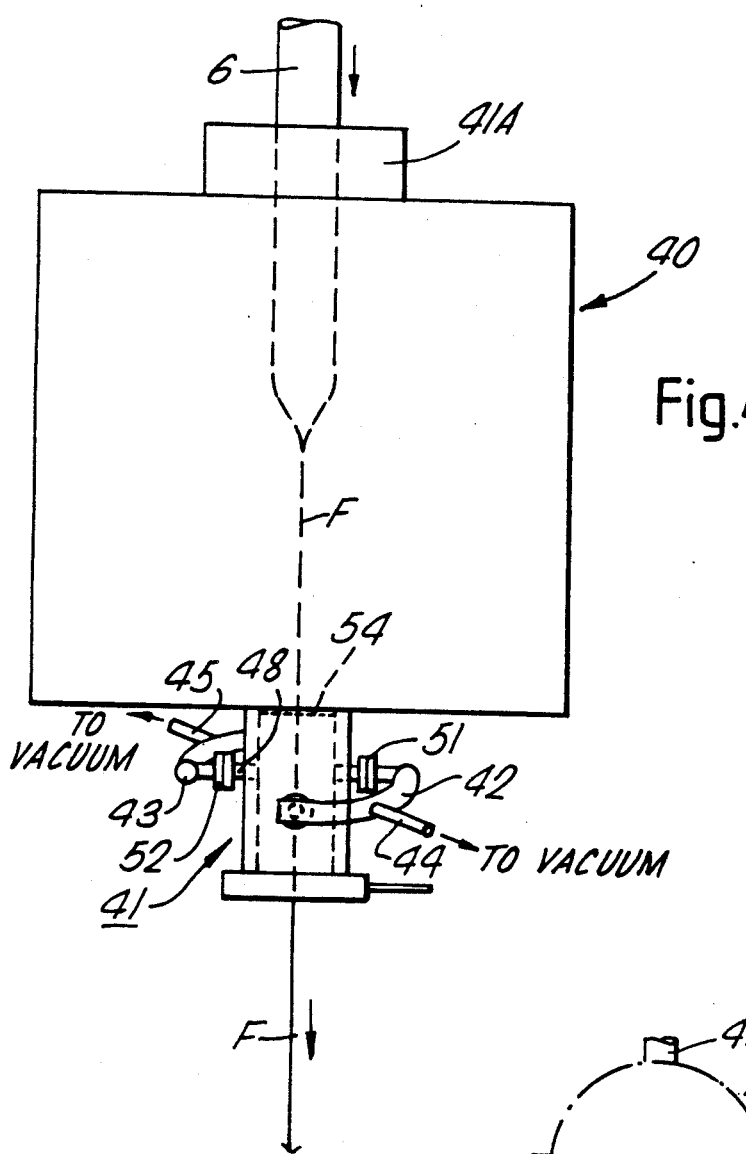
FIGS. 4A and 4B show a modification of the furnace of FIG. 1 according to a third embodiment of the invention.
Figure 4B:
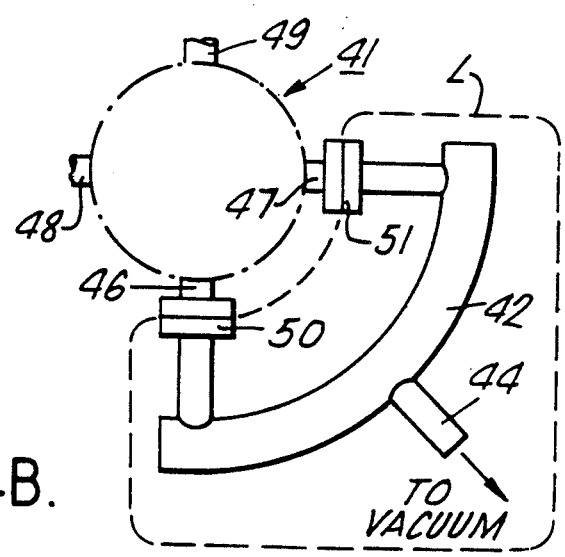

A further embodiment is shown in FIGS. 4A and 4B.

Referring to these figures, the furnace 40 is similar to that described earlier but in place of the removable insert or the replaceable gas port, has a fixed gas port 41 supporting two gas manifolds 42 and 43 each of part circular configuration and each coupled by a pipe 44 and 45 respectively to a vacuum source (not shown). FIG. 4B shows one manifold in plan view.

Each manifold 42 and 43 is coupled to a pair of gas transfer pipes 46, 47 and 48, 49 respectively by self sealing break joint 50, 51, and 52, respectively. The temperature of the walls in the zone immediately upstream of the ports i.e. inside the gas port 41 is high enough to minimise if not prevent silica condensation but the manifolds 42 and 43 are much cooler and condensation is predominantly if not wholly within them. The upper part of the gas port 41 can be insulated or at least not cooled so much by the furnace cooling jacket, and/or the furnace can be run at a higher temperature. Since these manifolds are away from the fibre being drawn, the dust build up can be greater before cleaning is required. When cleaning is necessary, then the self-sealing break joint 50 to 52 can be opened while the furnace is still at fibre drawing temperature and the manifolds 42 and 43 cleaned with a brush and/or by a gas blast, and the joints then replaced, all in a matter of minutes and without ramping down the furnace. The broken line L indicates the removable manifold which can be cleaned. An iris 54 in the gas port 41 will be closed during this operation to isolate the furnace environment from the outside atmosphere and also to protect the operator from the heat radiation of the furnace and hot gasses.

The silica vapour is encouraged to enter the manifold before it condenses out, by ensuring the temperature in the region just upstream of the pipes 46 to 49 is maintained high enough to prevent condensation occurring, e.g. by using insulation of the upstream part of the gas port 41 and/or by running the furnace at a higher temperature.

The manifolds 42 and 43 are made of stainless steel tubing.

Although the manifold is shown on the lower gas port because in these embodiments there is a gas flow from top to bottom, it would also be possible to have the manifold on the upper gas port 41A if, for example, there is no positive gas flow downwards and so convection effects carry the silica vapour upwards and out through the upper gas port 41A and into the manifold there.

Figure 2:
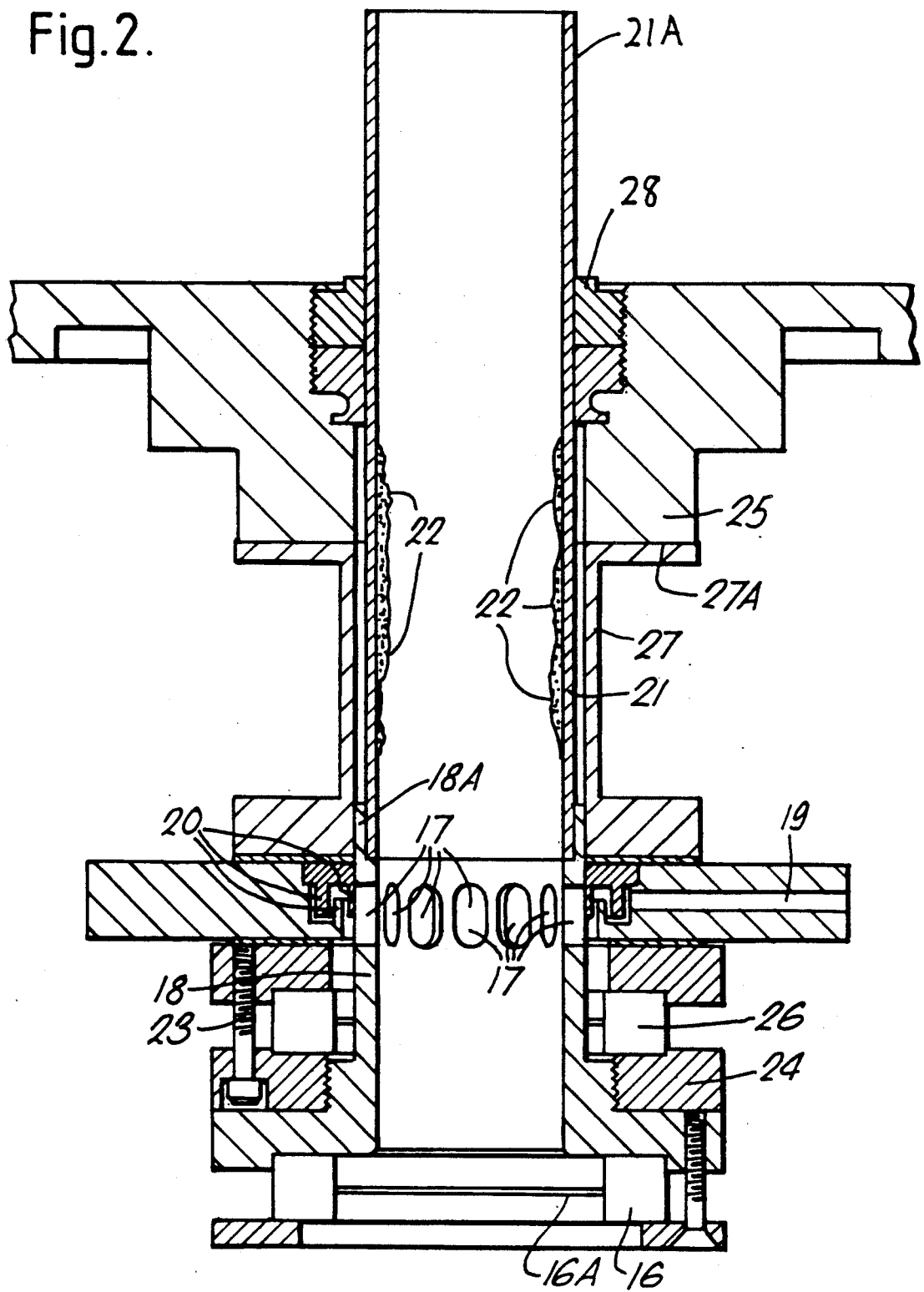
FIG. 2 shows a detail of FIG. 1 on a larger scale.

The same convection effect could enable the two previous embodiments, i.e. FIGS. 1 and 2 and FIG. 3 to have the insert or the standby gas port arranged at the top of the furnace instead of at the bottom.

What is claimed is:

1. A method of operating an optical fibre drawing furnace having a preform entrance and fibre exit, comprising providing the furnace with a duct, running the furnace at a temperature in the range suitable for drawing optical fibre from a preform, melting a preform in the furnace progressively and drawing a fibre from the preform, extracting gases from the duct so that contaminants produced by the drawing process traverse said duct, and become deposited on said duct, ceasing drawing said fibre, and, while maintaining the furnace at or near said temperature, and closing the entrance and exit, removing the deposited contaminant, and finally drawing further fibre from a fibre preform in the furnace after opening the entrance and exit.

2. A method as claimed in claim 1 wherein the exit is provided with said duct.

3. A method as claimed in claim 1 wherein the duct comprises a removable tubular insert located in the exit, and wherein after the entrance and exit are closed the insert is withdrawn and replaced with a clean insert for removing the deposited contaminant.

4. A method as claimed in claim 1, wherein the exit comprises a first assembly incorporating said duct, and there is a second of said assemblies incorporating a second of said ducts positioned adjacent said first assembly, said deposited contaminant removal comprising sliding the first assembly to one side and sliding the second assembly into the position originally occupied by the first assembly, in order to remove the deposited contaminant.

5. A method as claimed in claim 1 wherein said exit is provided with several of said ducts, each of said ducts located radially away from the drawing axis and having a cover which is removable, said deposited contaminant removal comprising uncovering said ducts, cleaning said ducts, and recovering said ducts, in order to remove the deposited contaminant.

6. An optical fibre drawing furnace having a preform entrance and fibre exit, a duct, means for running the furnace at a temperature suitable for drawing optical fibre through the exit from a preform by progressively melting the preform entering through the entrance in the furnace, means coupled to said duct for extracting gases from the furnace through the duct whereby contaminants produced by the drawing process will traverse said duct so that said contaminants become deposited on said duct, said duct being removably secured to the furnace so that the deposited contaminants carried by the duct can be removed from the furnace with the duct, while the furnace is maintained at or near said temperature.

7. A furnace as claimed in claim 6 wherein the duct comprises a removable tubular insert located in the exit, and means for closing said entrance and exit while the insert is withdrawn and replaced.

8. A furnace as claimed in claim 6, wherein the exit comprises a first assembly incorporating said duct and occupying a first position, and a second of said assemblies incorporating a second of said ducts mounted adjacent said first assembly is provided, said first assembly being mounted for sliding to one side away from said first position and said second assembly being mounted for sliding into said first position .

* * * * *